US012688014B2

(12) United States Patent
Abdulhayoglu et al.

(10) Patent No.: US 12,688,014 B2
(45) Date of Patent: Jul. 21, 2026

(54) GENERATING APPLICATIONS FOR VARIOUS PLATFORMS BY USE OF A NO CODE ENVIRONMENT

(71) Applicant: Nu Computing Abstraction Layer LLC, Bloomfield, NJ (US)

(72) Inventors: Melih Abdulhayoglu, Montclair, NJ (US); Yagmur Sahin, Verona, NJ (US)

( * ) Notice: Subject to any disclaimer, the term of this patent is extended or adjusted under 35 U.S.C. 154(b) by 93 days.

(21) Appl. No.: 18/103,630

(22) Filed: Jan. 31, 2023

(65) Prior Publication Data

US 2023/0409291 A1 Dec. 21, 2023

Related U.S. Application Data

(60) Provisional application No. 63/305,412, filed on Feb. 1, 2022.

(51) Int. Cl.
G06F 8/34 (2018.01)

(52) U.S. Cl.
CPC ...................................... G06F 8/34 (2013.01)

(58) Field of Classification Search
CPC ........................................................ G06F 8/34
USPC ........................................................ 717/109
See application file for complete search history.

(56) References Cited

U.S. PATENT DOCUMENTS

| | | | |
|---|---|---|---|
| 8,181,254 B1 * | 5/2012 | Kay ........................ | G06F 21/51 |
| | | | 713/168 |
| 10,896,035 B1 * | 1/2021 | Abdulhayoglu .......... | G06F 8/60 |
| 2021/0208859 A1 * | 7/2021 | Kapadia .............. | H04L 67/1097 |
| 2022/0019425 A1 * | 1/2022 | Yang ........................ | G06F 21/16 |

OTHER PUBLICATIONS

"Siamak Farshidi et al. Model-drive development platform selection: four industry case study, Jan. 15, 2021" (Year: 2021).*

* cited by examiner

*Primary Examiner* — Bradford F Wheaton

(74) *Attorney, Agent, or Firm* — Joseph P. Aiena

(57) ABSTRACT

A system and method of application management is provided for an application packaged before publication to an application environment. The system and method include selecting a package for publishing, where the package developed from a no code platform. A packaging process is initiated and a package modal is opened. A validation step is performed on the package and selections of the type and version of the package are made. Once the status of the application is identified, the application is published to a preselected domain of a second and different platform environment.

6 Claims, 18 Drawing Sheets

Application Development and
Release Process

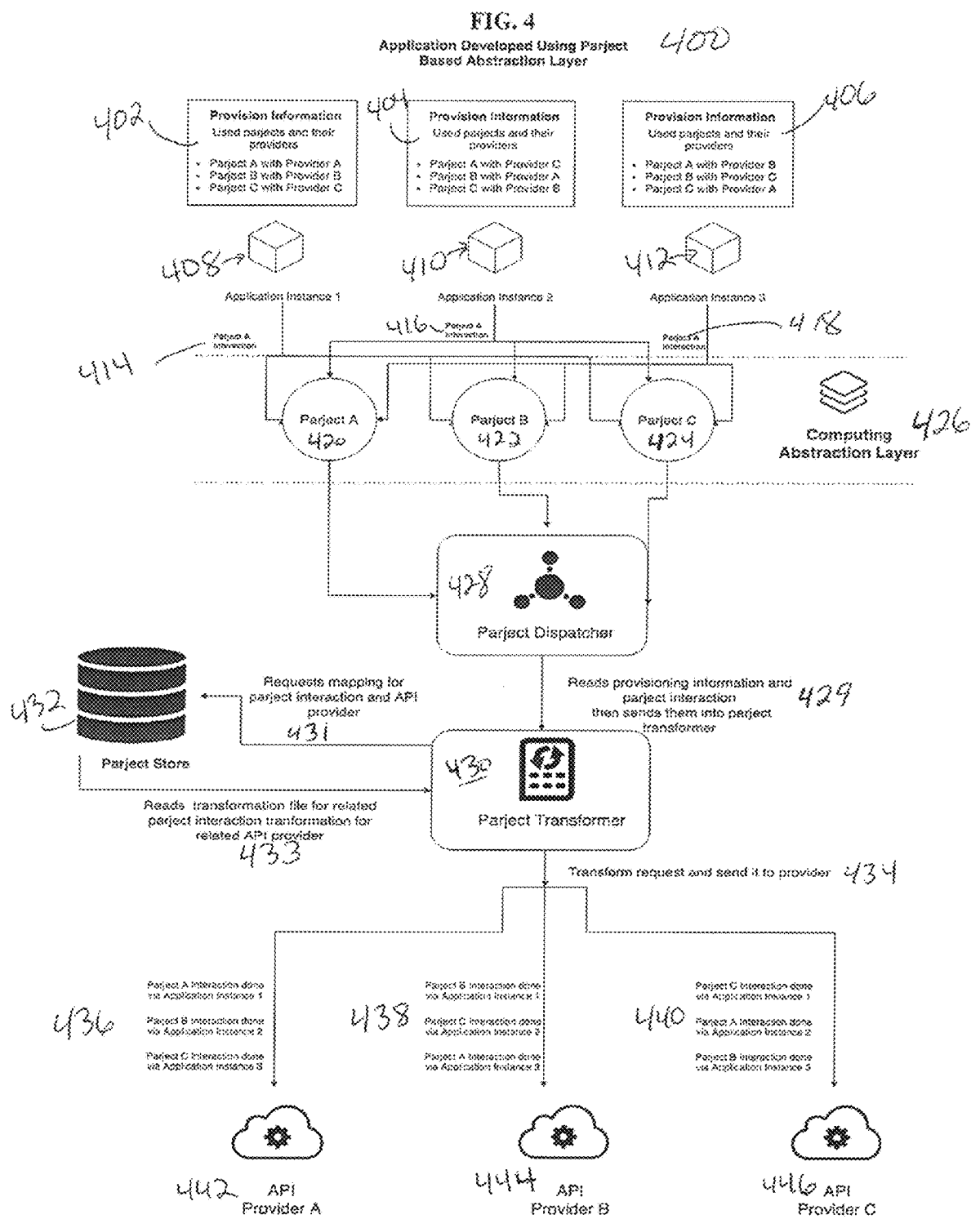

FIG. 4
Application Developed Using Parject Based Abstraction Layer    *400*

*402*
Provision Information
Used parjects and their providers
• Parject A with Provider A
• Parject B with Provider B
• Parject C with Provider C

*404*
Provision Information
Used parjects and their providers
• Parject A with Provider C
• Parject B with Provider A
• Parject C with Provider B

*406*
Provision Information
Used parjects and their providers
• Parject A with Provider B
• Parject B with Provider C
• Parject C with Provider A

*408* Application Instance 1

*410* Application Instance 2

*412* Application Instance 3

*414* Parject A Interaction

*416* Parject B Interaction

*418* Parject C Interaction

Parject A *420*

Parject B *422*

Parject C *424*

*426* Computing Abstraction Layer

*428* Parject Dispatcher

*432* Parject Store

*431* Requests mapping for parject interaction and API provider

*429* Reads provisioning information and parject interaction then sends them into parject transformer

*430* Parject Transformer

*433* Reads transformation file for related parject interaction transformation for related API provider

*434* Transform request and send it to provider

*436*
Parject A Interaction done via Application Instance 1
Parject B Interaction done via Application Instance 2
Parject C Interaction done via Application Instance 3

*438*
Parject B Interaction done via Application Instance 1
Parject C Interaction done via Application Instance 2
Parject A Interaction done via Application Instance 3

*440*
Parject C Interaction done via Application Instance 1
Parject A Interaction done via Application Instance 2
Parject B Interaction done via Application Instance 3

*442* API Provider A

*444* API Provider B

*446* API Provider C

500

PUBLISHING AN APPLICATION ON NuCAL STUDIO

Preconditions:

1. Users should be registered to NuCAL App Portal (developers.nucal.com).
2. Users should have already created a project with a unique name.
3. Users should already be logged in to NuCAL Studio (studio.nucal.com).
4. There should already be created a home screen with any available template (For now, NuBlank or NuSide).

When the preconditions are fulfilled, users will be able to see the following screen (with NuBlank template).

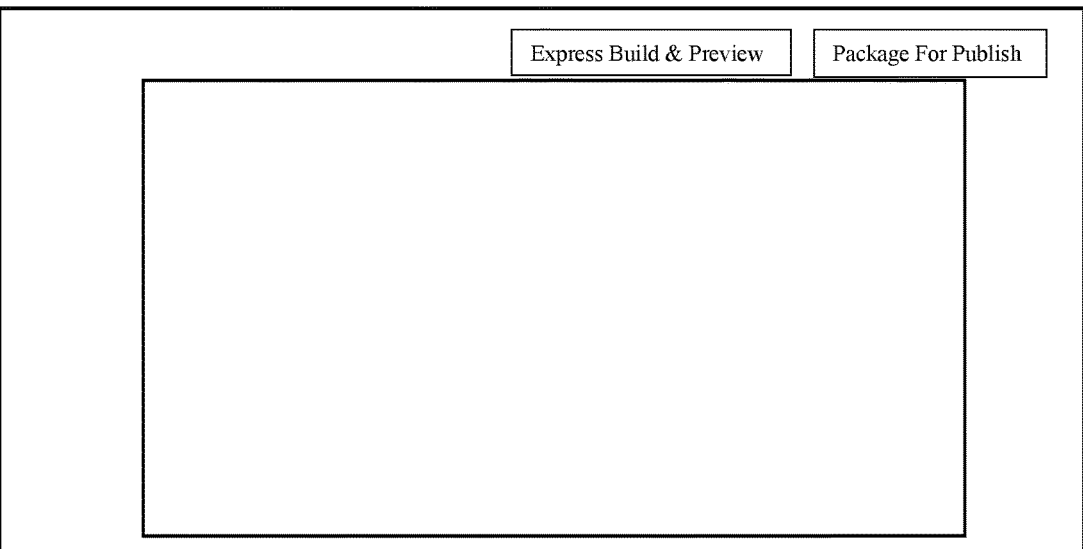

FIG. 6          *Main Screen*

Figures 7, 8:
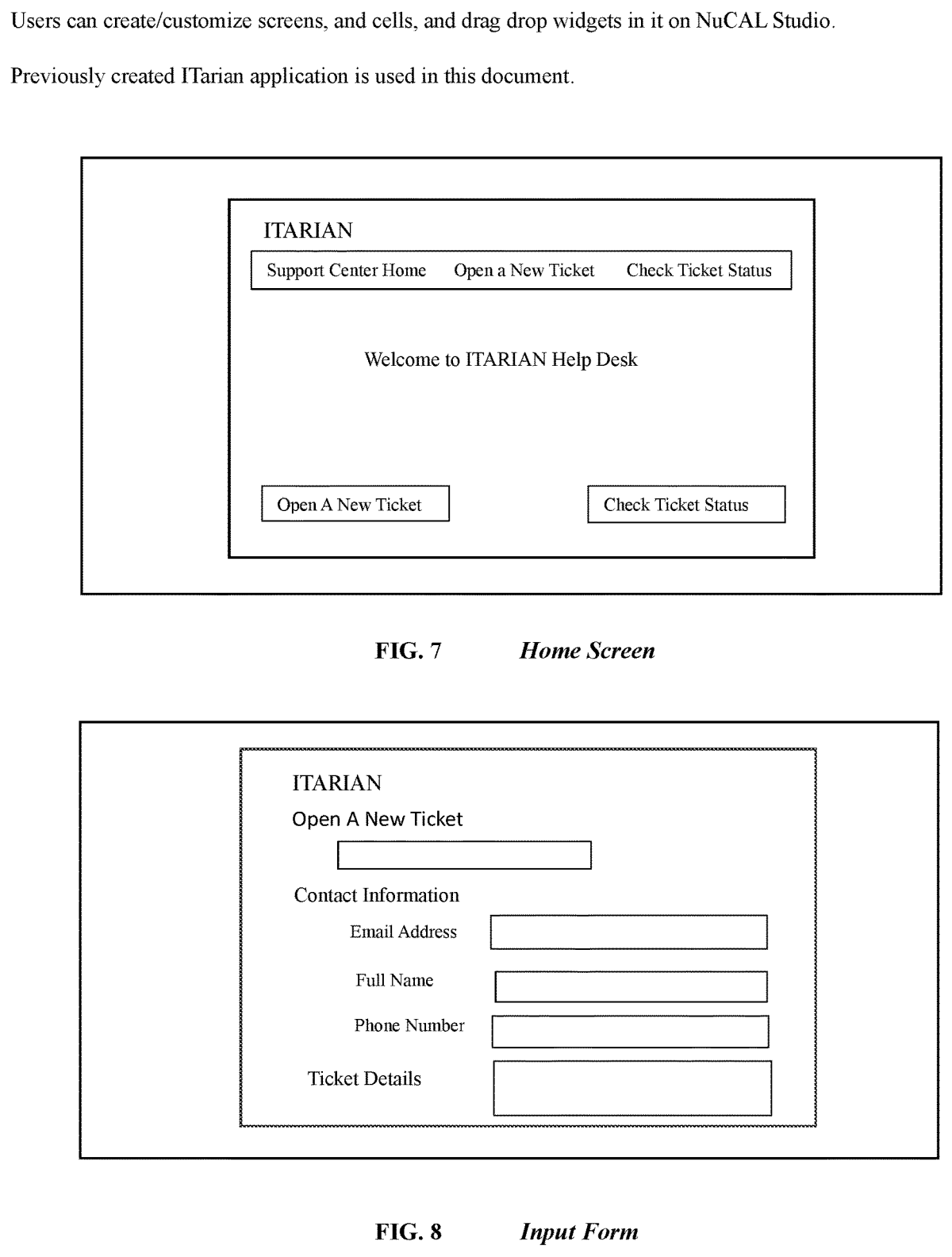

Users can create/customize screens, and cells, and drag drop widgets in it on NuCAL Studio.

Previously created ITarian application is used in this document.

ITARIAN

| Support Center Home | Open a New Ticket | Check Ticket Status |

Welcome to ITARIAN Help Desk

| Open A New Ticket |     | Check Ticket Status |

FIG. 7     *Home Screen*

ITARIAN

Open A New Ticket

Contact Information

Email Address

Full Name

Phone Number

Ticket Details

FIG. 8     *Input Form*

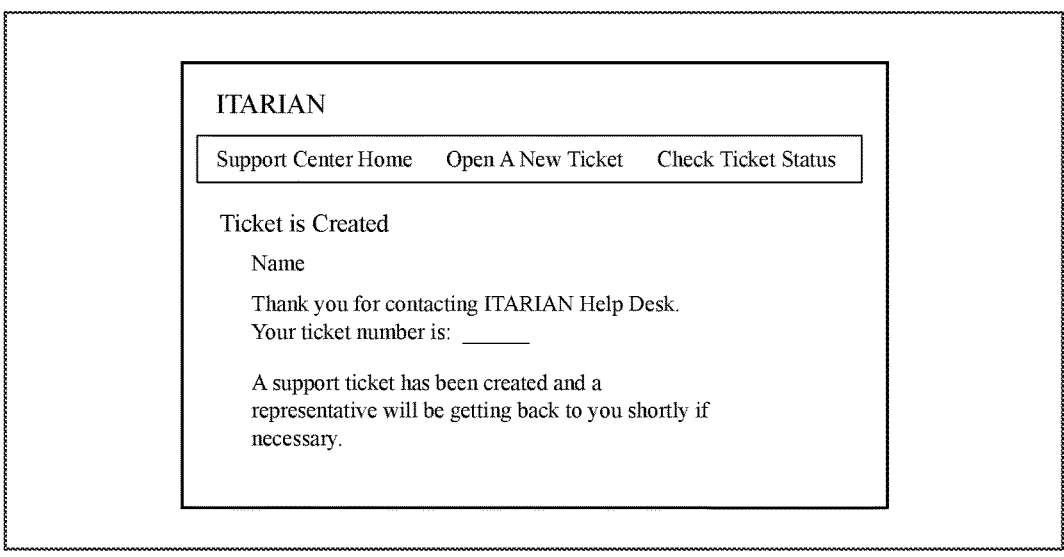
FIG. 9          *Last/Information Screen*
After creating screen(s), users can create flow(s) with Screen or Widget Events. Then, users can add activity(ies) on the flow.
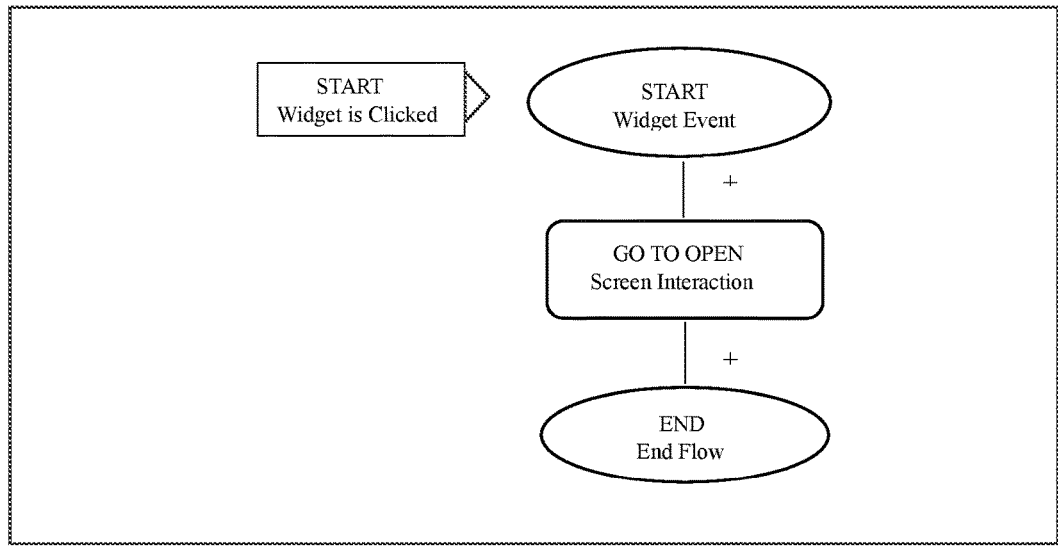
FIG. 10       *'Open the New Screen' Flow*

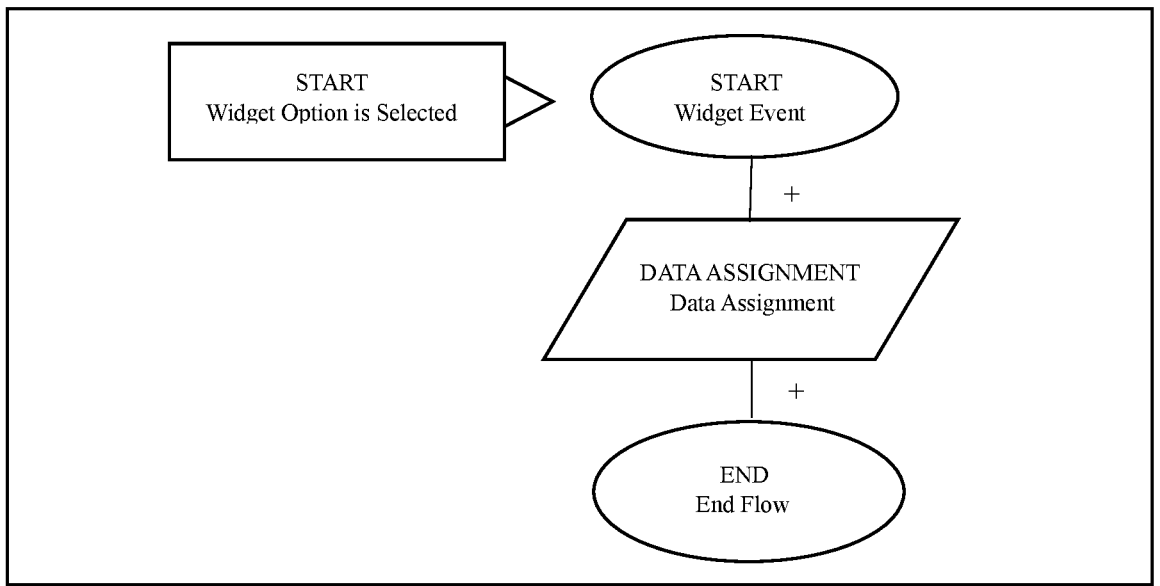
FIG. 11          *'Select a Value from Dropdown' Flow*
Package for Publish
ITARIAN
Support Center Home     Open A New Ticket     Check Ticket Status
Open A New Ticket
Please fill in form below to open a new ticket.
Category
FIG. 12          *'Package for Publish' Button*

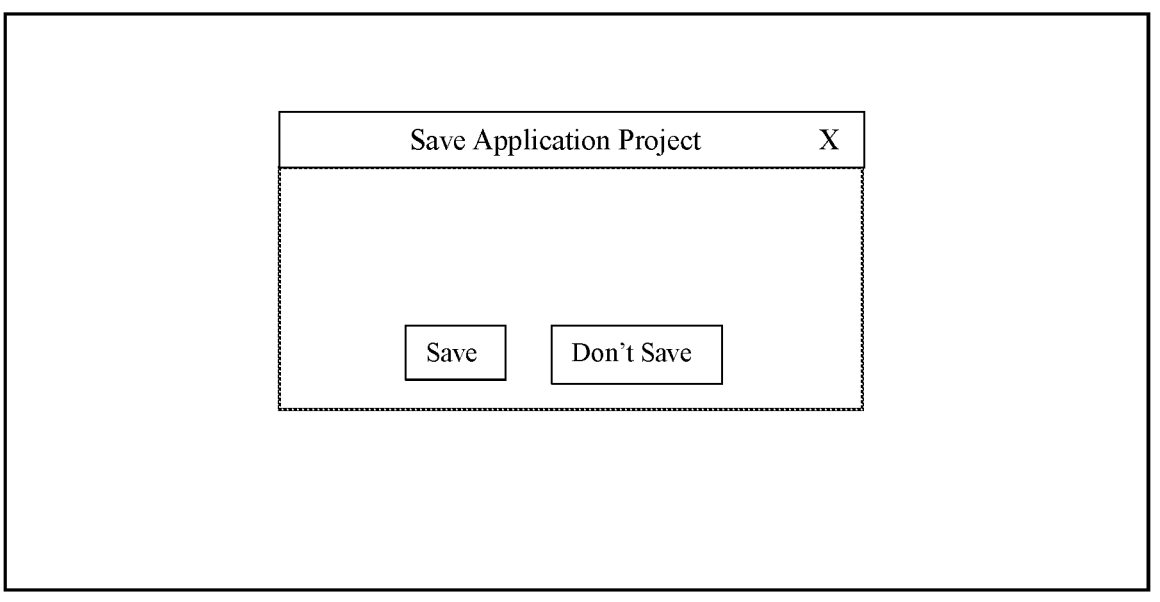
FIG. 13     *'Save Application Project' Modal*
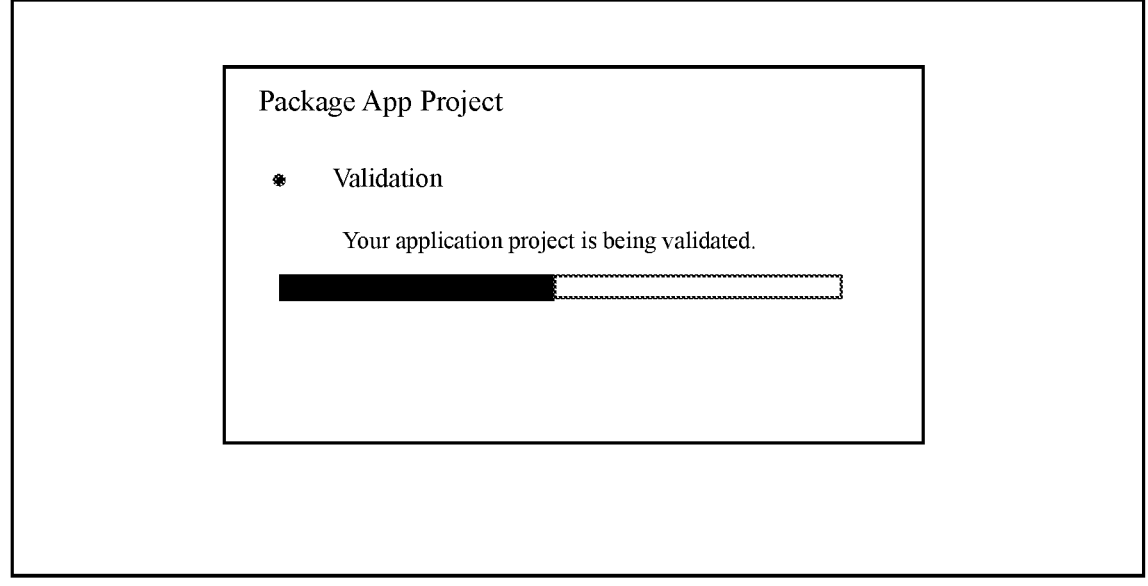
FIG. 14     *'Validation' Step*

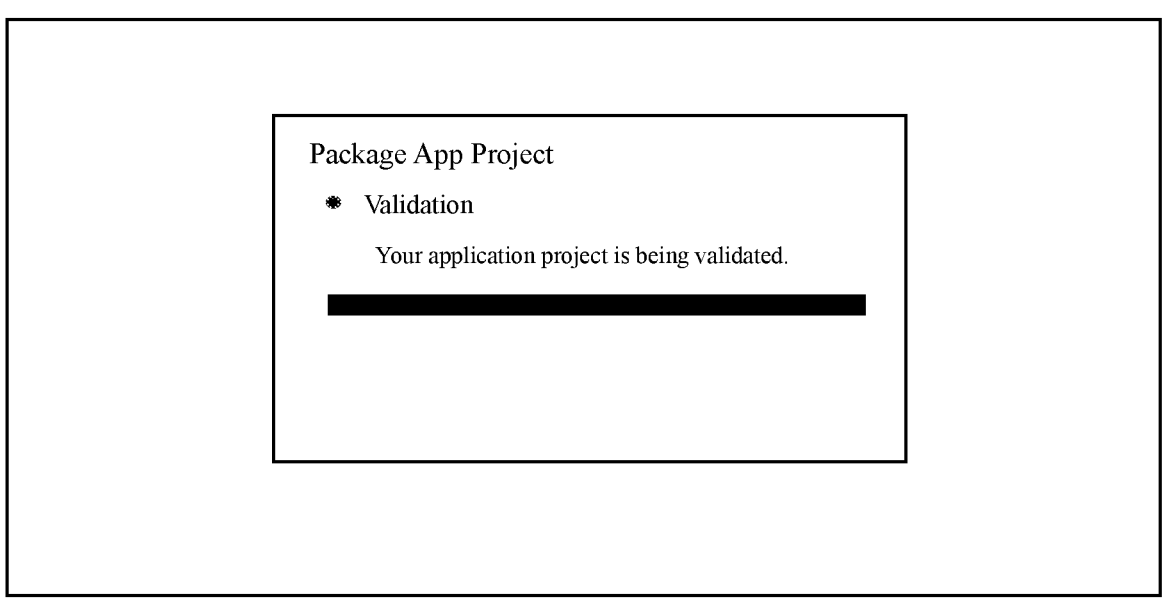
FIG. 15      *'Successful Validation' Step*
Package App Project
✺   Validation
✺   Select Package Type
☐ Web Application    ☐ IOS Application    ☐ Android Application
Continue
FIG. 16      *'Select Package Type' Step*

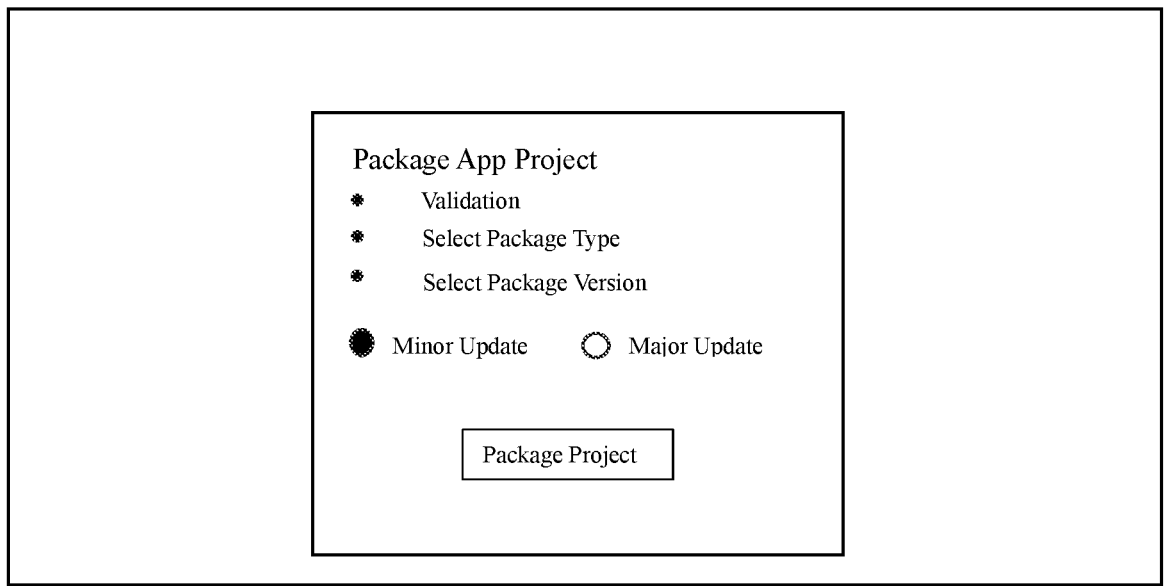
FIG. 17 *'Select Package Version' Step*
FIG. 18     *'Packaging Status'* Progress

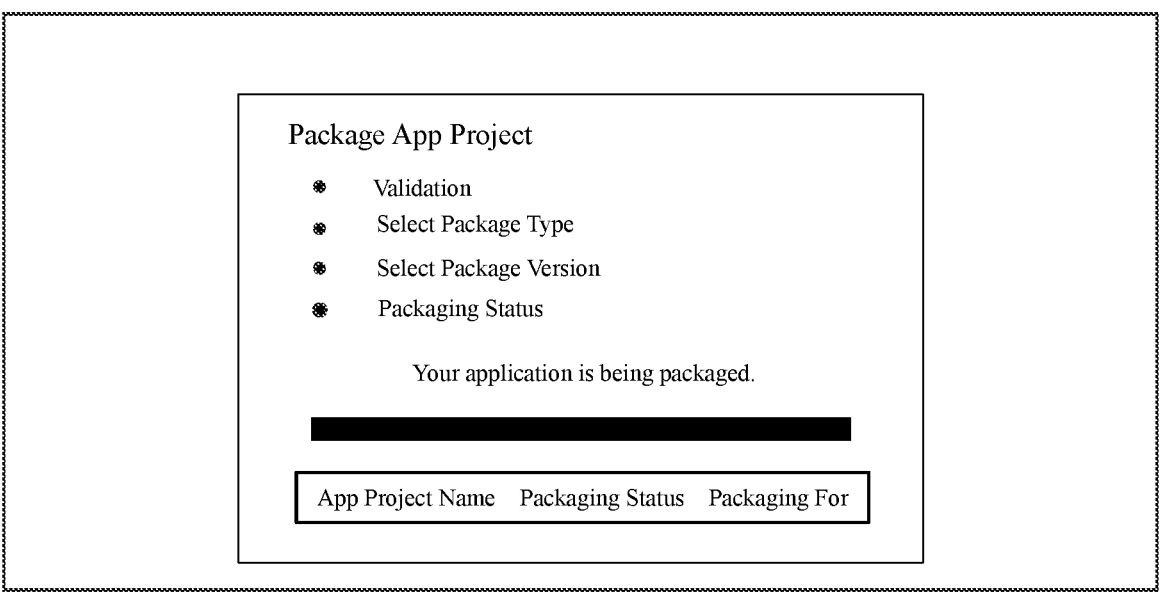
FIG. 19     *'Packaging Status' Progress Completed Successfully*
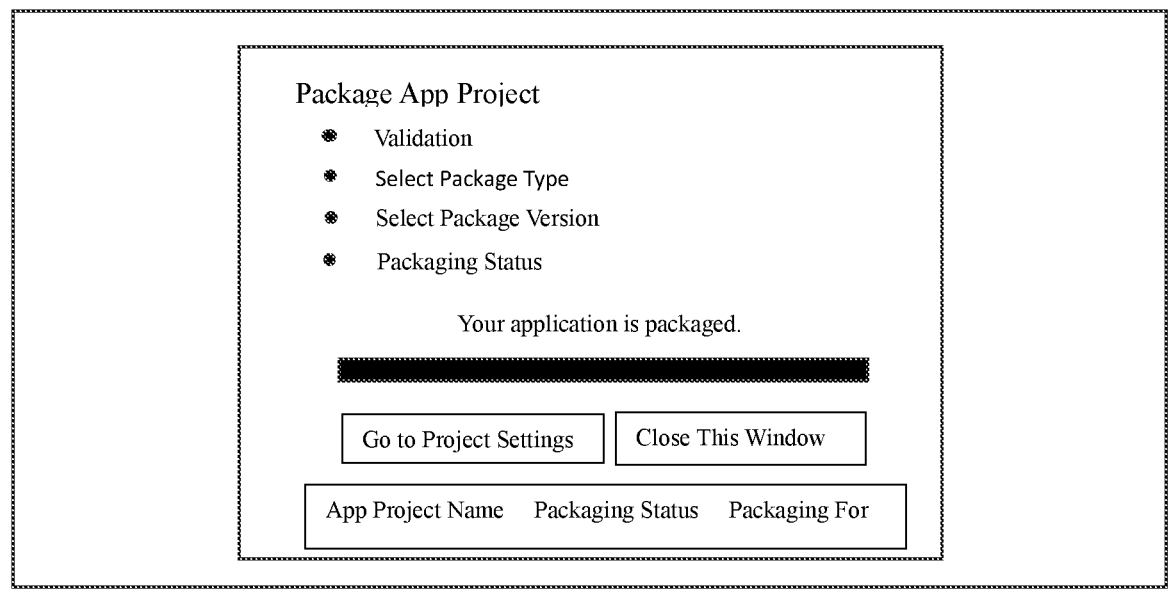
FIG. 20     *'Go to Project Settings' Button*

| Edit on Studio | Publish |
|---|---|

ITarian Help Desk

| General Settings | Save Changes |
|---|---|

Upload

FIG. 21     *'Publish' Button*

| Edit on Studio | Publish |
|---|---|

ITarian Help Desk

General Settings

☐ Web Application

☐ Publish to NuCAL Cloud

☐ Mobile Application

☐ Update to IOS Application Package

☐ Update Android Application Package

☐ Publish to NuCAL Store

| Publish to Selected Domain | Cancel |
|---|---|

Upload

FIG. 22     *Publish to Selected Domains*

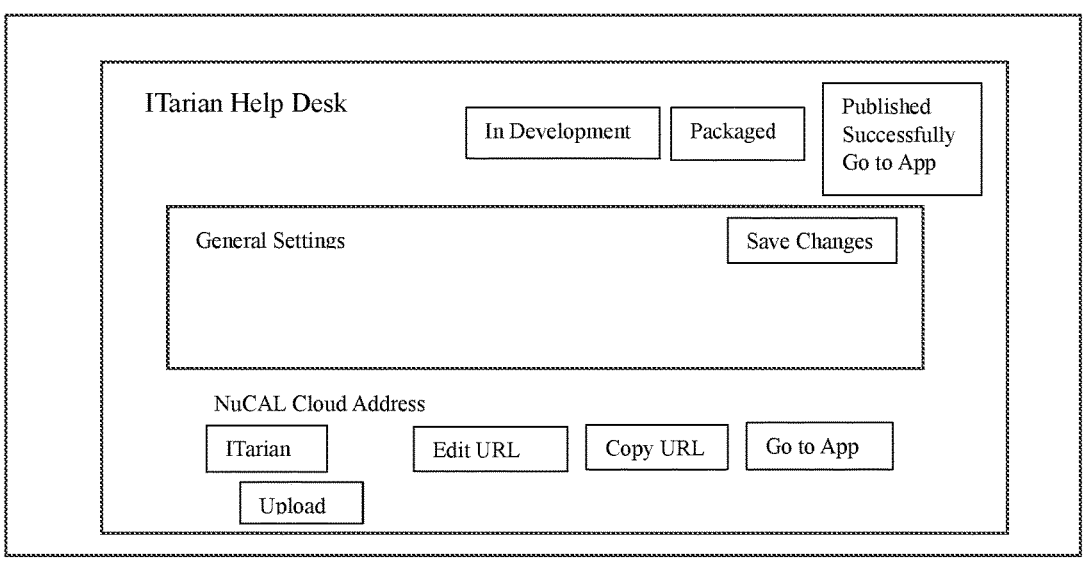
FIG. 23          *Go to App*
Home screen will be opened at runtime.
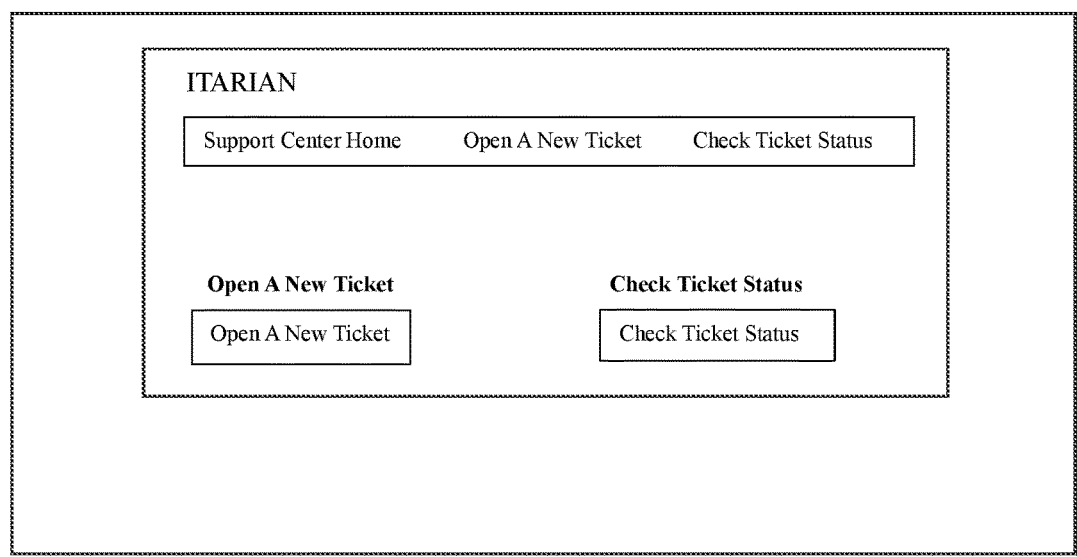
FIG. 24          *Home Screen at Runtime*

Figure 25:
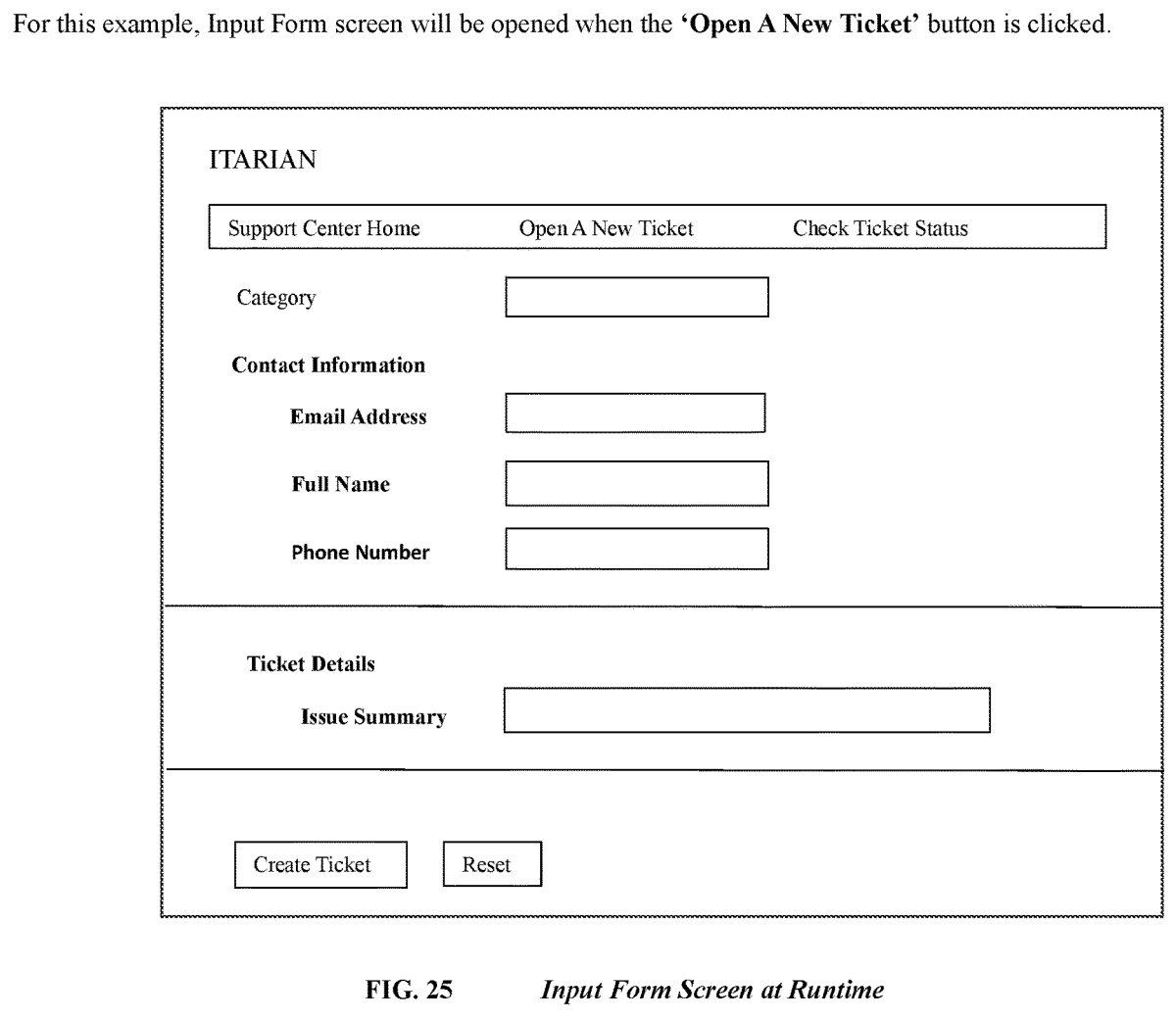

For this example, Input Form screen will be opened when the 'Open A New Ticket' button is clicked.

ITARIAN

| Support Center Home | Open A New Ticket | Check Ticket Status |

Category

Contact Information

Email Address

Full Name

Phone Number

Ticket Details

Issue Summary

Create Ticket    Reset

FIG. 25    *Input Form Screen at Runtime*

ITARIAN

| Support Center Home | Open A New Ticket | Check Ticket Status |
|---|---|---|

Open a New Ticket

Feedback
General Inquiry
Report an Asset Issue
Report an Access Issue

| Create Ticket | | Reset |
|---|---|---|

FIG. 26        *Select a Value From Dropdown*

When users fill the required values and click the 'Create Ticket' button,

ITARIAN

| Support Center Home | Open A New Ticket | Check Ticket Status |
|---|---|---|

Category

Contact Information

Ticket Details

Ticket will be created and information screen will be opened.

| Create Ticket | | Reset |

FIG. 27     *'Create Ticket' Button*

The ticket will be created, and an information screen will be opened.

ITARIAN

| Support Center Home | Open A New Ticket | Check Ticket Status |
|---|---|---|

Ticket is Created

Test

Thank you for contacting ITARIAN Help Desk. Your ticket number is _____ .
A support ticket request has been created and a representative will be getting back to
you shortly if necessary.

ITarian Team

Copyright 2021 ITarian All Rights Reserved

FIG. 28     *Last/Information Screen at Runtime*

GENERATING APPLICATIONS FOR VARIOUS PLATFORMS BY USE OF A NO CODE ENVIRONMENT

CROSS REFERENCE TO RELATED APPLICATIONS

This application claims the benefit of and priority to U.S. Provisional Patent Application Ser. No. 63/305,412 filed on Feb. 1, 2022, and incorporated by reference herein in its entirely.

FIELD OF THE INVENTION

The present invention relates to the generation and formatting of code across multiple platforms.

BACKGROUND

All applications over the world have different set of capabilities, diverse user experiences and a variety of targeted audiences. But from a specific user perspective application user mostly use a set of applications in their daily life and this trend seems going to rise with growing technology. In this world of applications, as a user controlling applications from single point, operating them together for common use cases or customizing them according to user needs is an emerging need. However, many applications in the world from enterprise level to consumer ones have static logic flows, their own data and at most several integrations with other applications.

Applications over the world mostly have an API set and a viewer user interface for their user interactions, data displays. For the most part, the application capability is on API side. Creating dynamic application flows, customizing user interfaces or integrating with different applications require handshake between products, integration and customization development. On the other hand, despite the latest development of technology, application development is still a costly and time-consuming process taking into account development, test and deployment processes. Application development process becomes longer and costlier when application complexity as developing a multi-platform enterprise level application with integrations of different products and APIs increases. Moreover, any application flow or infrastructure change requires extra development, data migration, maintenance and test effort.

A traditional approach in application development is creating an application development environment, selecting a framework or programming language to code user interfaces and background logic, packaging and deploying it to a cloud environment. The new technology comes with many automation and extensibility features. New approaches in application development are: No-code or low-code platforms for application development; customization features like workflow engines inside applications; managed cloud services and serverless architecture for abstraction.

Despite many automatized application development optimizations which have emerged, the approaches are still very far away from removing boundaries between world-wide products. Although newly no code platform capabilities shorten many application development processes, updating, integrating with different applications, testing, deploying and maintaining applications are still in problems of application developers in addition they still target the real application developers. Moreover, in current approaches customization of applications are very limited to application domain. There is no chance to orchestrate different capabilities of different domains in one application.

Existing approaches in application development directly depend on platforms, API providers and programming languages. Application developers need to customize their applications for different platforms. Any change in underlying API providers or integration with different products result in modification of applications and requires development, test and deployment effort. Each application brings along a server deployment, maintenance and scalability effort.

There is also a need to publish applications across multiple platform types for an application developed within a no code environment.

SUMMARY

The present invention is a method of converting APIs into Objects and allowing developers to create applications using these objects and deploying them without requiring their own servers.

The present invention provides a computational abstraction layer that is formed of objects which are generated via conversion of worldwide APIs and a development environment in which developers can create their applications using objects without requiring their own servers. The system aims to represent any computational Internet Protocol (IP) connected capability as an object in a system and serve those objects in an Integrated Development Environment (IDE) for application developers to create their applications as they wish without coding and run them without requiring their own servers.

The present invention provides application developers the ability to develop, deploy and run any type of application on a platform. With the present invention, there is a specialized application development environment and application developers create their applications on the system using a computing abstraction layer which is a pool with large set of Parjects. Each application is created using one or more Parjects which are formed via conversion of Application Programming Interfaces (API).

The present invention creates a computational abstraction layer over all worldwide application capabilities and give users the chance to orchestrate capabilities with a customized user experience according to their needs. This invention provides a computational abstraction layer that is formed of Parjects which are generated via conversion of worldwide APIs and a development environment in which developers can create their applications using Parjects without requiring their own servers. The system aims to represent any computational Internet Protocol (IP) connected capability as a Parject in system and serve those Parjects in a no code Integrated Development Environment (IDE) for any type of application developers who can create their applications as they choose or select, without coding and run them without requiring their own servers.

The present invention provides a method which includes creating an application over an integrated development environment and run on a cloud based environment, where the application uses at least one object as a capability function. The present invention communicates the application to a computing abstract layer which comprises an object pool having the at least one object, and the at least one object having an identifier associated with the at least one object. The method of the present invention checks the use of said at least one object in said application by an object dispatcher, and directs the request to at least one API by the object dispatcher without the use of a server. The method dispatches the at least one object by the object dispatcher to the at least one API; and returns a response by the at least one API to the application. The method of the present invention includes where the object dispatcher directs the request to an agent application which runs on IP connected devices.

For and with the invention discussed above, the present invention includes a generation of and formatting of code across multiple platforms which is done by use of a no code environment. The system and method of the present invention includes application management for an application packaged before publication to an application environment. This includes selecting an application package for publishing, where the package is developed from a no code platform. The application is packaged by initiating a packaging process and opening a package modal. A validation step is performed on the package and the user selects a package type for the package as well as a version of the package. Upon identifying a status of the package, the application is published to a preselected domain of a second platform, which may be different than the original platform. The original application developed from and with use of the no code environment platform is able to be published across multiple platforms and operating systems, such as Android, iOS, or a Web application.

BRIEF DESCRIPTION OF THE DRAWINGS

FIG. 4 is a schematic of an application instance scenario with different Parject each is supported via different API providers.

FIGS. 6 to 28 illustrate screen captures of the present invention for publishing an application.

DETAILED DESCRIPTION

The present invention is based on a computing abstraction layer which is formed of Parjects for any set of capabilities in the world. The Parject based application development system has a set of entities that makes the platform available for end users and application developers. The generation of and formatting of code across multiple platforms which is done by use of a no code environment and then publishing the application to one or more platforms, and different types of platforms and operating systems and environments.

Figure 1:
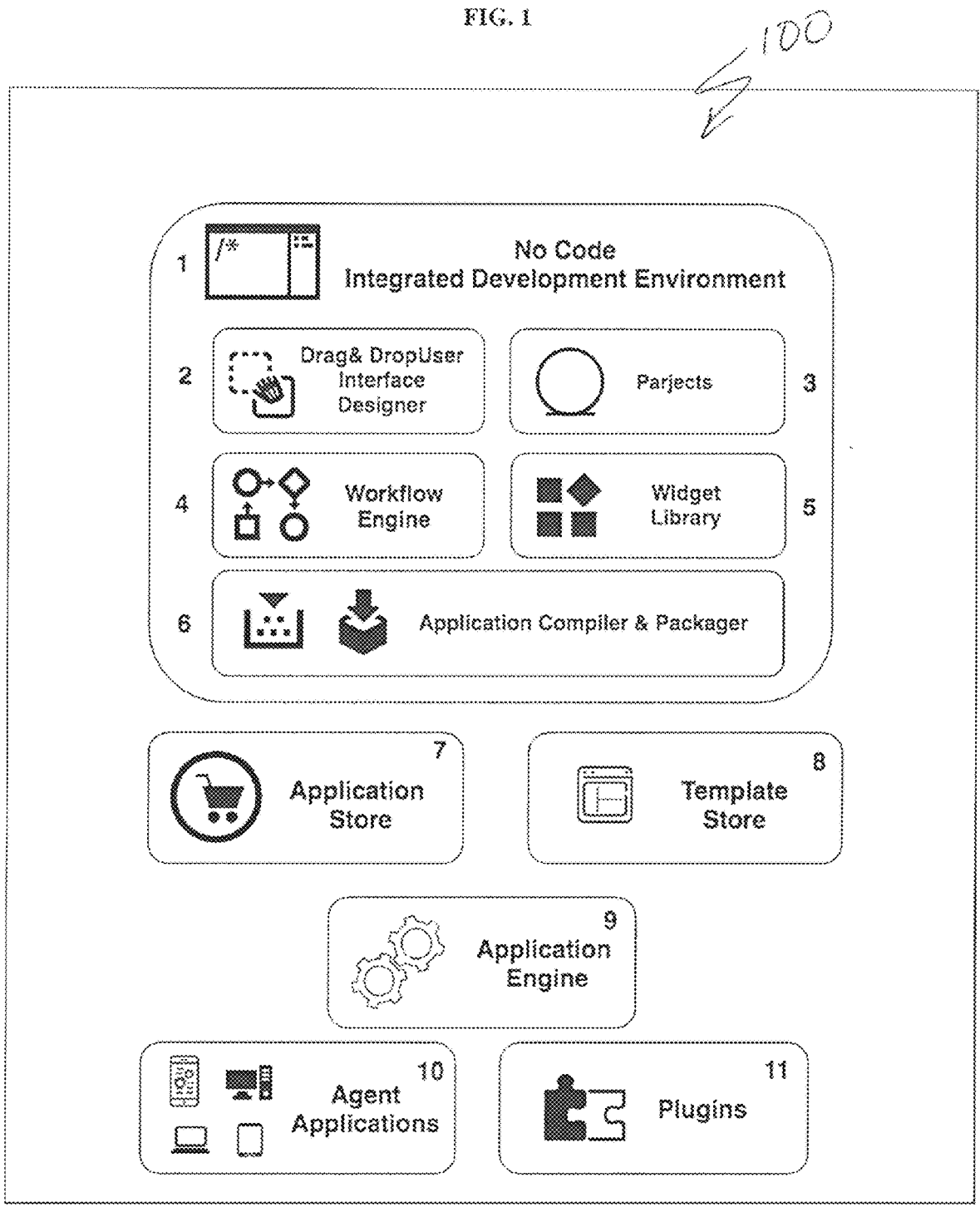
FIG. 1 illustrates the entities in the present invention Parjects based application development system.

FIG. 1 shows entities of an object based application development system. A definition of each of the entities in FIG. 1 is provided below, with numbers referencing corresponding items and features in the accompanying drawing.

No Code Integrated Development Environment (IDE) (1): The no code integrated development environment is a main tool to give application developers ability to create applications over Parject based computing abstraction layer. IDE manages application and template development. Application project creation and development via drag and drop user interface designer, Parjects and workflow engine are the main practices of application development over IDE. Application compilers and packagers for web, mobile and desktop applications are provided via IDE.

Drag and Drop User Interface (UI) Designer (2): Application user interfaces for any type of application are created over IDE using a UI Designer which provides capabilities for creating different pages for different use cases. UI Designer module works with drag & drop capability using widget library. Each widget can be added via drag & drop interaction and page design can be done with mouse and keyboard controls. Those controls include positioning, sizing, styling, cut, copy, paste, group and other configurations which can be done over widgets. IDE activities are completely done without coding and targets also non-coder developers as well as experienced ones.

Parjects (3): Parjects are the main components of the present invention and are the software part or portion as an object. Parjects represent a variety of capabilities of worldwide APIs and plugins which work on desktop and mobile devices. Parjects are used over IDE as they are added to application projects and used as capability set in the applications. Parjects are formed of a set of attributes, interactions and callback events. Attributes represents the data model and relationships with other Parjects. Interactions represents the interactions that an end user(s) can do over a data content. Callback events are the system interactions that triggers from system state changes. Parjects are software parts as objects, and they provide a large set of capabilities to create any type application. Parjects are created via conversion of APIs and each Parject can have more than one API provider. The computing abstraction layer creates a complete abstraction via Parjects over APIs. An application is developed using Parjects 3 and packaged once. Then each application buyer has freedom to configure their application instance with different provider per Parject or Parject group than other buyers.

Workflow Engine (4): Parject based application development system enables development of applications using UI elements and Parjects 3. The application and business logic of application and connection between them is provided via workflow engine. Workflow engine 4 has a set of activities for: using Parject 3 interactions via gathering inputs from UI widgets or other data sources like old Parject interaction results or variables; displaying Parject interaction results and their data on UI widgets or saving them for future usages; UI manipulation capabilities like page direction, changing UI behaviors on runtime; callback, widget and error event trigger handling. The workflow engine 4 provides application developers chance of easily changing the application behavior and ability to create any type of application for any type use cases.

Widget Library (5): Parject based application development system enables development of applications using UI widgets, Parjects 3 and workflow engine 4. UI Design of web, mobile and desktop applications are managed completely using widget library 5. Each widget is added to designer via drag & drop action and configured over designer. Each widget has a set of properties to be configured at application development time, widget events to reflect end user activities to workflow engine and a set of functions to give ability to change its property configurations at application run time. Widgets are customized to Parject 3 and other widget interactions to make the development environment without coding and minimum user interaction for any type application developers.

Application Compiler & Packager (6): The applications developed over IDE are compiled and converted to an application bundle depending on selected platform. It can be a web application, a desktop application or it can be a mobile application or all of them. The applications are compiled into related platform's application and packaged from IDE.

Application Store (7): The packaged applications developed over IDE are versioned and deployed to application store 7 if application developer wants to sell it. The application store 7 is the main container for applications which are developed for sale. Application buyer can buy applications and configure them according different licensing options, and Parject providers.

Template Store (8): The applications developed over TDE can be packaged as application template for other developers to use it as a base and edit it. Application templates are published on template store 8 for sale. Application developers who do not want to start from scratch will have ability to purchase a template and start development on it. Templates are just the packaged versions of application projects.

Application Engine (9): The provisioned applications run on the application engine 9. For each application, a containerized instance is prepared, and the application is run over it. All the resource management, scalability and maintenance of application is managed by application engine.

Agent Applications (10): Parjects 3 represent capabilities of worldwide APIs as well as any computational IP connected device capabilities. For each platform there is an agent application that provides exposition of device capabilities as Parjects 3. Agent applications are responsible for plugin management and communication with devices.

Plugins (11): Each capability that works on IP connected devices is represented as plugin and run by the agent application 10. Any new plugin 11 can be added to system or removed without changing agent application 10.

Application & Template Development

Figure 2:
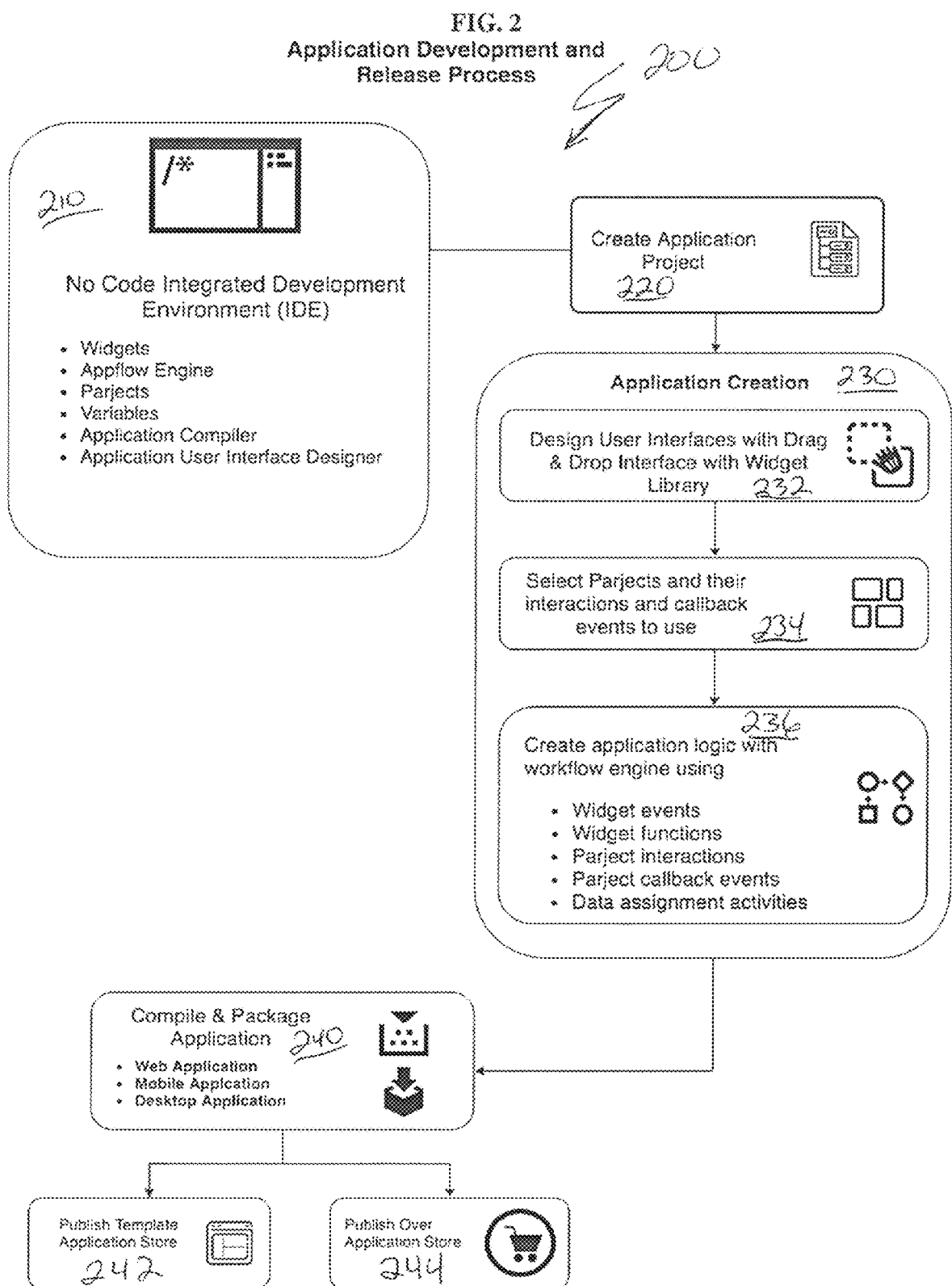
FIG. 2 illustrates the application development lifecycle using Parjects.

The application and template development is now described with reference to FIG. 2 for how the application development process 200 using Parjects 3 is managed. Parject based computing abstraction layer exposes as outputs like applications or templates. The application or template development process is very similar and the following activities are done during that process. Within the No Code Integrated Development environment 210, there exists the widgets, appflow engine, Parjects 3, variables, application compiler 6, and application user interface designer. The application project is created 220 according to purpose of application via platform selection web, mobile or desktop. Then, the Application development process includes a set of activities which depends on application, as shown with application creation step 230. Within the Application creation 230, there is design of user interfaces with a drag & drop designer and widget library 232, then adding Parjects 3 into project, by selecting Parjects 3 and their interactions and call back events to use 234; and then creating application logic with a workflow engine 236 combining one or more or all of: widget capabilities, such as widget events and widget functions with Parject interactions and callback events, and data assignment activities. After application creation is completed, the application development and release process 200 then performs compiling and packaging the application according to platform selection 240, including web application, mobile application, and desktop application. Depending on output, the process 200 includes publishing it as template for targeting application developers 242 or publish it as an application for targeting any type application buyers 244.

Application Run Time Lifecycle Over Parjects

Figure 3:
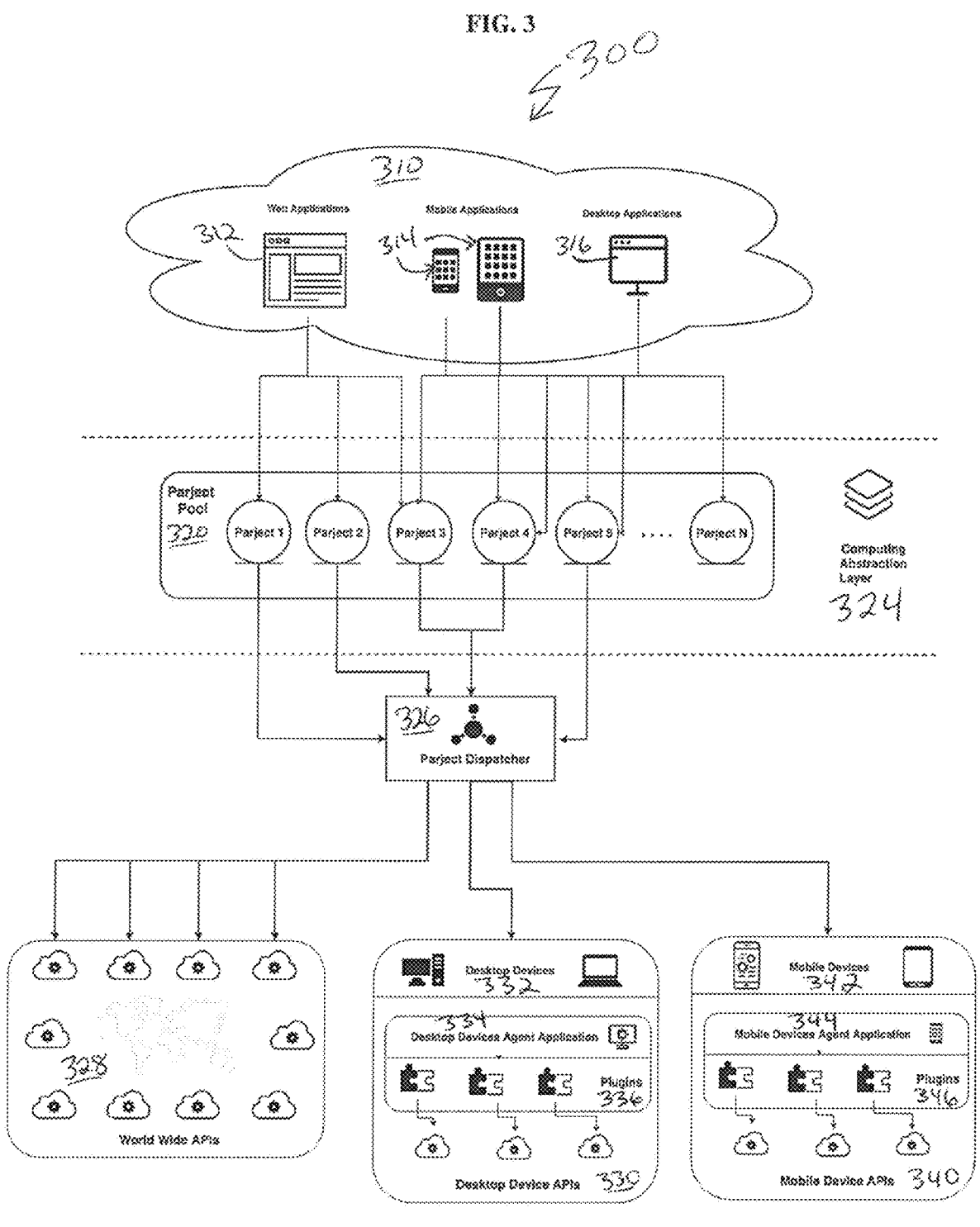
FIG. 3 is overall schematic of abstraction-based development system provided by Parjects.

Referring to FIG. 3 for a description of how the Parject based computing abstraction layer 324 works during an application's lifecycle 300. The applications of type web application (312), mobile application (314) or desktop application (316) are created over IDE then packaged and published to application store. Each packaged application is provisioned with a specific configuration according to selection of application buyer. Each provisioned application runs on a cloud platform 310 which is based on Parject 3 based computing abstraction layer, 324, that is formed by a pool 320 of Parjects indicated by Parject-1 through Parject-N. Application interactions depending on the application logic is managed by application workflow engine. Application interactions are including Parject interactions as steps in the workflow engine 4. The flow of a Parject interaction can be illustrated as: Application logic requires an interaction which creates a Parject interaction usage. This Parject interaction goes over computing abstract layer 324 and sends a request to Parject Dispatcher module 326. The Parject Dispatcher module 326 checks the application provisioning information and finds the provider of related Parject. The Parject Dispatcher module 326 receives the provider mapping request of related Parject interaction. Depending on the type of request, it is sent to provider API (328,330,340). It can be either one that goes over a device-based API (330, 340) or cloud API (328). Device based APIs are used for managing physical mobile (342) or desktop (332) devices. The device management capabilities are exposed via desktop agent applications (334) and mobile agent applications (344). Those agent applications (334,344) provide communication between Parject dispatcher (326) but their capabilities are exposed via desktop agent plugins (336) for desktop devices (332) and mobile agent plugins (346) for mobile devices (342). The result of Parject interaction is returns from the same path and come to Parject Dispatcher module (326) with a response mapping. The response is transmitted to application and application workflow logic continues to run.

Applications' Lifecycle with Different Parject Providers

The applications' lifecycle with different Parject providers will now be described with reference to FIG. 4. As described in FIG. 4, there is shown how an application instance can work with different Parject providers. Applications developed over Parject based computing abstraction layer provides an abstract environment which enables same application to work with different API providers without editing anything in the application itself. An application 400 is created once but each instance is provisioned separately and has ability to be configured different. This capability forms the core part of this invention. Each application is only aware of Parjects which are the doors of an application to world APIs. A Parject can have more than one API provider with same capabilities and each provisioned instance of an application can use different providers for same application. However, each application instance behaves same and does same thing. This is achieved with Parject based computing abstraction layer (426) modules.

Referring again to FIG. 4, the following three flow paths simulates an application with three different application instances with three different Parject usages with three different provider provisioning. For the first path, Flow Path 1, the precondition is set as follows: Application Instance 1 (408) uses three Parject interactions which are interactions of Parject A (420), Parject B (422) and Parject C (424). Application Instance 1 (408) is provisioned with Provision Information 1 (402). The Parject interaction of A, Parject Interaction of B and Parject interaction of C is called from application instance. The Parject interactions are reflected to Parject Dispatcher (428) over Parject based computing abstraction layer (426) with Provisioning Information 1

(402). The Parject Dispatcher module 428 reads the Provisioning Information 1 (402) to get the provider information for used Parject. The Parject Dispatcher 428 passes Provisioning Information 1 (402) to Parject Transformer (430) module. Step (429). The Parject Transformer (430) module sends provider information and used Parject interactions to Parject Store (432) to get the mapped provider requests of Parject interactions. Step (431). The Parject Transformer (430) reads the transformation files for related Parject interaction transformations for related API provider from Parject Store (432). Step (433). The Parject Transformer (430) transforms the requests for related providers and send them to providers. Step (434). The request for interaction of Parject A is sent and communicated to API Provider A (442). Step (436). The request for interaction of Parject B is send and communicated to API Provider B (444). Step (438). The request for interaction of Parject C is send to API Provider C (446). Step (440). The responses from each of API Providers (442, 444, 446) follows the same path from opposite direction and finalizes as the Application Instance 1 (408) interaction result.

For the second path, Flow Path 2, the precondition is set as follows: Application Instance 2 (410) uses three Parject interactions which are interactions of Parject A (420), Parject B (422) and Parject C (424). Application Instance 1 (410) is provisioned with Provision Information 1 (404). The Parject interaction of A, Parject Interaction of B and Parject interaction of C is called from application instance. The Parject interactions are reflected to Parject Dispatcher (428) over Parject based computing abstraction layer (426) with Provisioning Information 2 (404). The Parject Dispatcher module 428 reads the Provisioning Information 2 (404) to obtain the provider information for used Parject. The Parject Dispatcher passes Provisioning Information 2 (404) to Parject Transformer (430) module. Step (429). The Parject Transformer (430) module sends provider information and used Parject interactions to Parject Store (432) to obtain the mapped provider requests of Parject interactions. Step (431). The Parject Transformer (430) reads the transformation files for related Parject interaction transformations for related API provider from Parject Store (432). Step (433). The Parject Transformer (430) transforms the requests for related providers and sends them to providers. Step (434). The request for interaction of Parject A is sent to API Provider C (446). Step (440). The request for interaction of Parject B is sent to API Provider A (442). Step (436). The request for interaction of Parject C is send to API Provider B (444). Step (438). The responses from API Providers (442, 444, 446) follows the same path from opposite direction and finalizes as the Application Instance 2 (410) interaction result.

For the third path in FIG. 4, Flow path 3, the precondition is set as follows: Application Instance 3 (412) uses 3 Parject interactions which are interactions of Parject A (420), Parject B (422) and Parject C (424). Application Instance 1 (412) is provisioned with Provision Information 1 (406). The Parject interaction of A, Parject Interaction of B and Parject interaction of C is called from application instance. The Parject interactions are reflected to Parject Dispatcher (428) over Parject based computing abstraction layer (426) with Provisioning Information 3 (406). The Parject Dispatcher module reads the Provisioning Information 3 (406) to obtain the provider information for used Parject. The Parject Dispatcher passes Provisioning Information 3 (406) to Parject Transformer (430) module. Step (429). The Parject Transformer (430) module sends provider information and used Parject interactions to Parject Store (432) to get the mapped provider requests of Parject interactions. Step (431). The Parject Transformer (430) reads the transformation files for related Parject interaction transformations for related API provider from Parject Store (432). Step (433). The Parject Transformer (430) transforms the requests for related providers and send them to providers. Step (434). The request for interaction of Parject A is sent and communicated to API Provider B (444). Step (438). The request for interaction of Parject B is send and communicated to API Provider C (446). Step (440). The request for interaction of Parject C is sent and communicated to API Provider A (442). Step (436). The responses from each of API Providers (442,444,446) follows the same path from opposite direction and finalizes as the Application Instance 3 (412) interaction result.

The present invention has numerous advantages as it provides a new computing abstraction layer for all over the world's computational capabilities. This invention provides for API providers to reach many audiences with increasing their value with combination with other APIs that they are not able realize. It removes walls between products as representing them as Parjects. Further, the present invention provides the advantage of a no code application development environment over computational abstraction layer of Parjects in which updating, orchestrating, and testing applications is very easy and does not require deep technical knowledge. Moreover, deploying and running applications requires no effort. The customization of applications are very effortless using applications templates.

Figure 5:
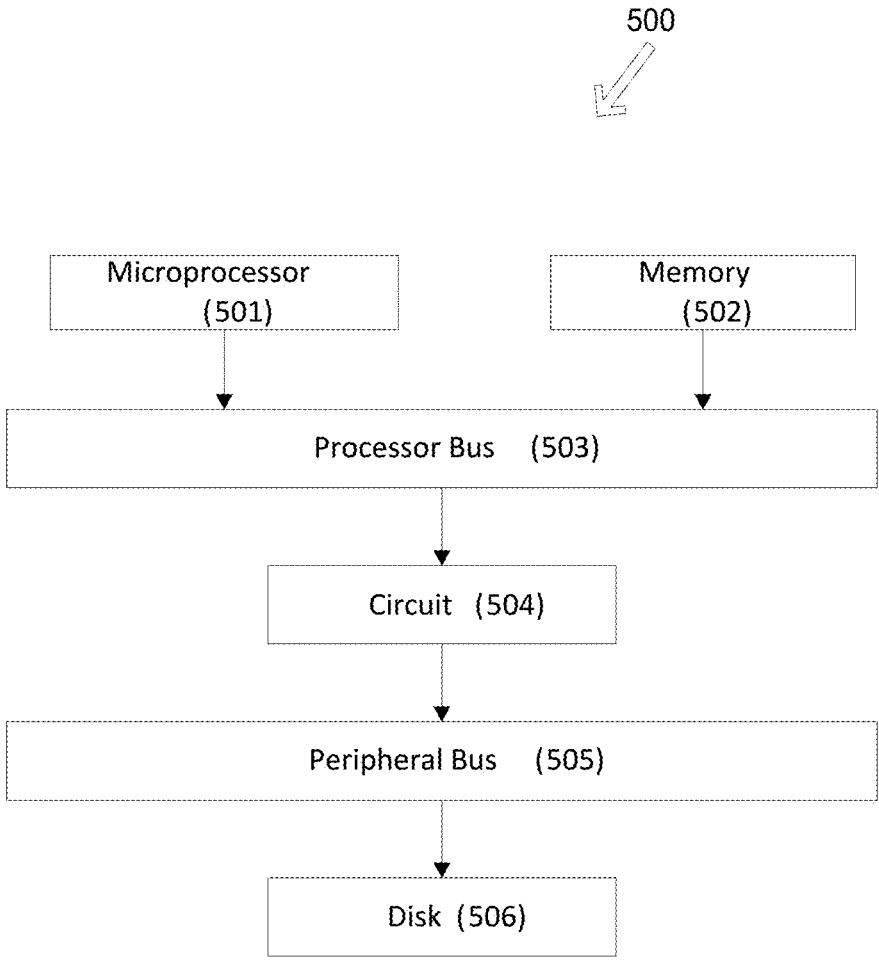
FIG. 5 is a schematic illustration of the connections of a computing system.

The present invention is used with the following FIG. 5 of computer systems, components, and internet access. FIG. 5 illustrates a system of a computer or device which includes a microprocessor 501 and a memory 502 which are coupled to a processor bus 503 which is coupled to a peripheral bus 505 by circuitry 504. The bus 505 is communicatively coupled to a disk 506. It should be understood that any number of additional peripheral devices are communicatively coupled to the peripheral bus 505 in embodiments of the invention. Further, the processor bus 503, the circuitry 504 and the peripheral bus 505 compose a bus system for computing system 500 in various embodiments of the invention. The microprocessor 501 starts disk access commands to access the disk 506. Commands are passed through the processor bus 503 via the circuitry 504 to the peripheral bus 505 which initiates the disk access commands to the disk 506. In various embodiments of the invention, the present system intercepts the disk access commands which are to be passed to the hard disk.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The present invention includes a system of generating code, using a no code platform, where by this code generated could be "formatted" to be a plugin or application for a different platform. The system generates code to be, for example, a browser extension, so the user chooses the "Output" of this application to be a browser extension and the described platform environment, can generate the application in a structure whereby, the application can be taken and given to an online/mobile device marketplace as an extension for a browser.

This is reflected in FIGS. 6 to 28, which represent a walk-through of the platform. Initially, users register to the application portal for development. The users then create a project with a unique name or a previously created project. The users are logged into the studio area and a home screen is created with any available template, including blank options or side features. When the preconditions are fulfilled, users will be able to see the FIG. 6 screen (which shows the blank template). The users can create and customize screens, and cells, and drag and drop widgets into the template on the studio area. In FIG. 7, there is shown the home screens where there is the previously created application named "ITarian" being used in this document. FIG. 8 depicts the input form and FIG. 9 depicts an information screen.

After creating screen(s), users can create flow(s) with Screen or Widget Events. Then, users can add activity(ies) on the flow. This is illustrated in FIG. 10 as the "open the new screen" image and in FIG. 11 as the user can select a value from a dropdown as indicated by the flow diagram.

Referring to FIG. 12, in the studio application management system of the present invention, an application project is packaged before it is published to any environment. The packaging process is triggered via the studio by simply clicking the 'Package for Publish' button located at the top-right side of the Top Pane. This button is displayed as enabled if user changes anything within the application project. Otherwise, the button should be disabled, and the application project cannot be packaged. When this button is clicked, the Packaging Process will be started, and the Package modal will be opened. This process has 4 steps ("Validation", "Package Type Selection", "Package Version Selection" and the "Package Status") and each is triggered if the current one is successfully configured.

As indicated in FIG. 13, the "Save" application project modal is opened when the user clicks the 'Package' button. In FIG. 14, the validation step is initiated. The validation is automatically started when the user clicks the 'Save' button. To package the application, the project should not have any validation errors. If the Validation is completed successfully, information is displayed, such as FIG. 15, and the process is continued with the next step automatically.

If the Validation is completed successfully, the user can select "Web", "IOS" and/or "Android" option(s). At least one option must be selected to continue the packaging process. If the Application Project Type is Web Only, "iOS Application" and "Android Application" options will be disabled. If the Application Project Type is Mobile Only, "Web Application" option will be disabled. If the Application Project Type is Web & Mobile, all options will be enabled. This is illustrated in FIG. 16, with the Select Package Type step. Linux based applications are included within the scope of the invention.

Referring to FIG. 17, if the validation is completed successfully and the user already selected one or more packaging type(s), then, he or she is able to decide whether the current package is a major or minor update for the application. By default, minor is displayed as selected automatically. In another option, a user also can add a Package Note to this package and later see it on a Version Management tab when hovered over or on the related package.

If the validation is completed successfully and the user already selects one or more packaging type(s), then the building process is automatically started as indicated in FIG. 18 and completed in FIG. 19.

When the application project is successfully built, the user can either navigate to the project settings via the "Go to Project Settings" button or close the window to work with the project on Studio via the "Close this Window" button. For publishing, users can click the "Go to Project Settings" button. This is shown as FIG. 20.

The publishing process will be started when the user clicks the "Publish" button located at the top-right side of the Project Settings panel. (See, FIG. 21). With reference to FIG. 22, it is shown how users can publish already packaged applications to one of the provided publishing options. These options may vary in accordance with the latest package type of the application project that was selected during the packaging process at the studio. FIG. 22 illustrates publishing to select domains. When the publishing process finished successfully, user can click the 'Go to app' button to see the application. (FIG. 23). At runtime, the home screen will be opened, as indicated in FIG. 24. In the example shown, the Input Form screen is opened when the 'Open A New Ticket' button is clicked as seen in FIG. 25. The users fill the required fields and select a value from the dropdown menu (FIG. 26), the users are then able to click the 'Create Ticket' button (FIG. 27). Once the ticket is created, an information screen is opened. (FIG. 28).

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of application management for an application packaged before publication to an application environment, comprising:

developing a package from a no code platform, said package including an application created over a no code integrated development environment and run on a cloud based environment, said application using at least one object as a capability function; said at least one object formed of a set of attributes, interactions and callback events; said attributes are data model and relationships with a second at least one object; said interactions are from an end user interacting over data content; said callback events are system interactions triggered from system state changes;

communicating said application to a computing abstract layer which comprises an object pool having said at least one object, and said at least one object having an identifier associated with said at least one object; said at least one object created via conversion of at least one API and each of said at least one object having at least one API provider;

creating, by said computing abstraction layer, a complete abstraction by said at least one object over each API of said at least one API used in said application;

sending a request to an object dispatcher;

checking the use of said at least one object in said application by said object dispatcher, directing the request to said at least one API by said object dispatcher without the use of a server;

dispatching said at least one object by said object dispatcher to said at least one API; and returning a response by said at least one API to said application;

initiating a packaging process;

opening a package modal;

performing a validation step on said package;

selecting a type for said package, where said type is selected from web, mobile, or web and mobile;

selecting a version of said package;

identifying a packaging status of said package until said package is completed;

publishing said application to a preselected domain of a second platform where code of said application is generated to be a browser extension, and said application is generated in a structure where said application is given to an online market place as said browser extension and said online market place is said second platform.

2. The method of application management for an application packaged before publication to an application environment according to claim 1 wherein said no code integrated development environment includes widgets.

3. The method of application management for an application packaged before publication to an application environment according to claim 1 wherein said no code integrated development environment includes an appflow engine.

4. The method of application management for an application packaged before publication to an application environment according to claim 1 wherein said no code integrated development environment includes Parjects.

5. The method of application management for an application packaged before publication to an application environment according to claim 1 wherein said no code integrated development environment includes an application compiler.

6. The method of application management for an application packaged before publication to an application environment according to claim 1 wherein said no code integrated development environment includes an application user interface designer.

* * * * *